May 9, 1933.                    R. K. WINNING                    1,908,206
                      METHOD OF ASSEMBLING TUBULAR HOUSINGS
                            Original Filed Jan. 28, 1929
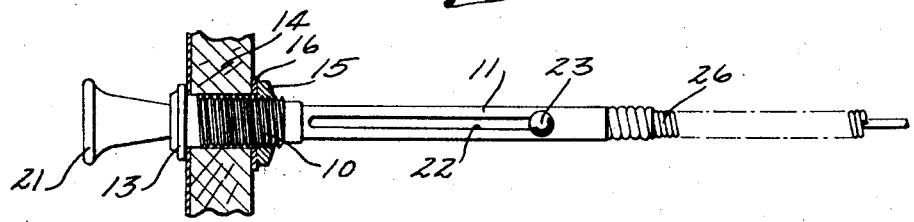
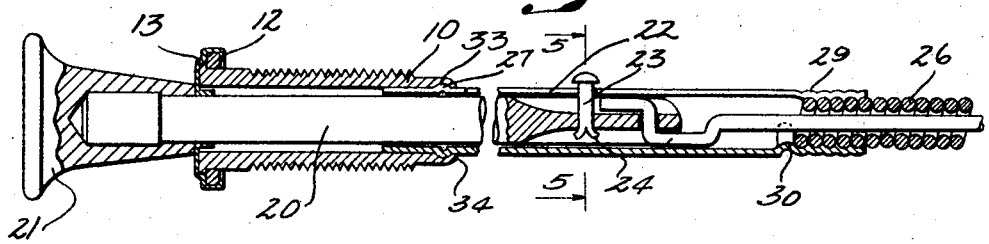
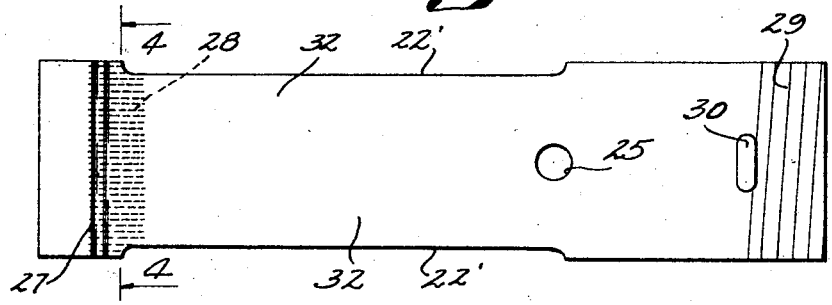
   
Inventor
Robert K. Winning
By Wheeler, Wheeler & Wheeler
Attorneys Patented May 9, 1933

1,908,206

UNITED STATES PATENT OFFICE

ROBERT K. WINNING, OF WAUWATOSA, WISCONSIN, ASSIGNOR TO CLUM MANUFACTURING COMPANY, OF MILWAUKEE, WISCONSIN, A CORPORATION OF WISCONSIN

METHOD OF ASSEMBLING TUBULAR HOUSINGS

Original application filed January 28, 1929, Serial No. 335,510. Divided and this application filed October 10, 1929. Serial No. 398,676.

This invention relates to improvements in methods of assembling tubular housings to other parts, particular reference being made to control rod housings and the attachment thereof to a suitable mounting device and Bowden wire sheath. It is the object of the invention to provide a novel and simplified method of attaching these parts through the use of inexpensive methods calculated to eliminate machine work.

This application is a division of my copending application for Control rod housings, Serial No. 335,510, filed January 28, 1929.

In the drawing:

Figure 1 is a plan view of a housing embodying this invention as it appears applied to the dash of a motor vehicle or the like.

Figure 2 is an enlarged axial section in a vertical plane through the housing shown in Figure 1.

Figure 3 is a still further enlarged detail of the blank from which the housing shown in Figures 1 and 2 is formed.

Figure 4 is a detail in transverse section on a smaller scale than Figure 3 showing the housing in process of formation.

Figure 5 is a transverse section taken in the plane indicated at 5—5 in Figure 2.

Like parts are identified by similar reference numerals throughout the several views.

The housing comprises a tubular supporting element 10 which may conveniently be die-cast, and a tubular sheath or housing member 11 which is preferably made from a stamped blank and formed as hereinafter disclosed. The die-cast supporting housing 10 of the housing is provided at 12 with a flange and an annular bezel 13 which covers the end of the housing and the flange and constitutes a head adapted to abut the outer surface of a dash 14. A nut 15 threaded to the supporting member 10 is tightenend against a lock washer 16 which is in face contact with the dash in opposition to the head above described. The clamping engagement of these parts upon the dash positions the entire device.

The control rod 20 is axially slidable through the housing and is provided exteriorly thereof with a knob 21. It is desirable to maintain this knob in a predetermined position of rotation in order that any lettering or design appearing on the face thereof may be kept erect. In order to accomplish this result a slot is provided at 22 in the sheath portion 11 of the housing and a rivet 23 extends through this slot into engagement with rod 20 and is upset at 24 to prevent its loss during the reciprocation of the rod. The rivet moves in slot 22 and serves to keep the rod and knob in predetermined angular relation to the housing. An opening formed at 25 in the housing permits the introduction of a tool to perform the riveting operation which upsets rivet 23 in the manner shown at 24. The arrangement whereby this riveting operation is conducted within the housing makes the housing much stronger than it would be if the rivet were extended through another slot similar and opposite to slot 22 and were riveted outside of the housing as has heretofore been the practice.

In the manufacture of the tube portion 11 of the housing it is necessary to provide for a means of attachment of such portion to the supporting sleeve 10 which will insure against relative rotation of the parts since the control rod and knob take their angular position from the tube and the tube must depend for its angular position upon the mounting support 10. It is also necessary to provide economically for the attachment of the helical wire sheath 26 to the parts already described. Through this sheath extends the Bowden wire to be operated by the control rod, such wire being connected thereto as disclosed in my co-pending application Ser. No. 163,084 filed January 24, 1927. Both of these objectives are cared for in the blank from which the tube 11 is formed.

Figure 3 shows the blank. It will be noted that it is cut away at 22' along its side margins so that when such side margins are rolled into adjacent positions the portions cut away will co-operate to provide the slot 22 in which the guide rivet 23 operates. At 25 appears the hole which is subsequently to enable the riveting operation to be conducted within the tube 11. At 27 the blank is transversely ribbed and at 28 the blank is provided with a transversely extending series of relatively short longitudinally disposed notches which may be formed by a die having teeth similar to the teeth of a saw but of greater extent. These notches extend across the rib 27.

At 29 the blank is provided with a series of angularly disposed and mutually parallel ribs adapted in the completed tube to serve as threads into which the end of the wire sheath 26 may be screwed. In order to limit the relative engagement of the parts the thread is mutilated by providing at 30 a boss which intersects the last of the ribs 29 and is of materially greater height than such ribs.

The blank being completed in the form shown in Fig. 3, it is necessary to form it to the shape of a tube.

It would be difficult if not impossible to bring the side margins of the blank into mutual abutment by any ordinary forming process. Accordingly the blank is first formed as shown in Figure 4 whereby the intermediate portion 31 thereof is given a curvature which is opposite to that which it will ultimately have in the completed tube and the side marginal portions 32 are each formed to approximately the exact curvature of the completed tube. With the side marginal portions thus formed to the desired curvature it is a relatively simple matter to exert pressure to reverse the curvature of the central portion 31 of the blank, thereby forcing the side margins into abutment.

The completed tube 11 is now introduced into the end of the supporting member 10 with the rib 27 abutting the shoulder 33 of the support. The end portion 34 of the support is now spun inwardly over the rib 27 and in the course of the spinning operation the metal of the support is forced into the notches or serrations 28, thereby perfecting a relatively non-rotatable joint between the parts.

Helix 26 is now screwed into the threads formed by ribs 29 until the end of the helix abuts the boss or lug 30 which stops further relative screwing movement. This completes the assembly of the parts.

I claim:

1. The method of forming a tube with threads which consists in cutting a blank representing the plane projection of the desired tube, forming in said blank ribs at an angle corresponding to the pitch of the desired threads and forming in said blank an additional rib intersecting one of the ribs aforesaid and adapted to comprise a stop, and finally forming said blank into tubular contour.

2. The method of mounting a tube in a sleeve which comprises the cutting of a blank, the formation of a transverse rib thereon, the formation of grooves disposed on lines intersecting such rib, the formation of said blank into a tube with the ribs and grooves exposed on the outer periphery thereof, the insertion of the tube into its sleeve, and the forming of the sleeve about the rib and into the grooves.

3. The method of providing a sleeve with a tubular extension which consists in cutting a blank, providing cuts on the surface of the blank at the point of engagement of the sleeve therewith, forming the blank to tubular contour with its cut surface exposed whereby to open said cuts in the form of grooves and forming the sleeve into the grooves of the tubular extension.

4. The method of providing a sleeve with a tubular extension which comprises cutting a blank, forming a transverse rib in such blank, forming the blank to tubular contour, inserting its ribbed portion within the sleeve, and forming the sleeve about the rib.

5. The method of providing a sleeve with a tubular extension which constitutes cutting a blank comprising approximately the plane projection of the desired extension, forming a rib intersected by transverse cuts in the blank, forming the blank to tubular contour whereby to expand said cuts, inserting the rib and cut portion of the tube into the sleeve, and forming the tube and sleeve into pressure engagement at said rib.

6. The method of mounting a tube in a sleeve which comprises forming the tube with a rib and intersecting grooves and forming the sleeve about the rib and into the grooves whereby said tube and sleeve are provided with interlocking parts, axially and rotatively fixed relatively to each other.

7. The method of uniting a tube and sleeve which consists in cutting a blank for the tube provided with a transverse rib and longitudinally extending grooves adjacent thereto, forming the blank to tubular shape with the rib and grooves exteriorly exposed, inserting the tube into the sleeve, and forming the sleeve about said rib and into said grooves.

8. The method of constructing a slotted tube which comprises cutting a blank having elongated portions of its margins cut away, pre-forming said blank to give its central portion a reverse curvature from that desired while imparting to its side portions the arcuate form of the completed tube, and subsequently reversing the curvature of the central portion of the blank thereby forcing the side margins thereof into abutment at either end of the portions cut away as aforesaid whereby to provide a tube in which the cut away portions of the side margins of the blank are in registry to provide a longitudinal slot.

9. The method of providing for attachment of a helical sheath to a tube which consists in cutting a blank for said tube, providing angularly disposed ribs adjacent one end of said blank adapted to register in the completed tube to provide threads suitable to receive the end of the sheath, forming a boss limiting the threaded engagement of the sheath with the tube and subsequently rolling said blank to comprise a tube having a threaded end and a limiting boss.

10. The method of forming a tubular housing to serve as a connector, which method includes the cutting of a blank pressing ribs at one end thereof at an oblique angle equal to the pitch of threads desired in the housing, nicking the surface of the opposite end of the blank, forming the blank into tubular contour whereby to bring opposite ends of said ribs operatively into abutment to provide a thread while opening the nicks in the outer surface of the tubular housing so formed.

11. The method of providing a part with a tubular extension which comprises cutting a blank for the desired extension, nicking the surface thereof, forming the blank to an arcuate shape adapted to distend the nicked surface and to open the nicks therein, inserting the nicked surface of the formed blank into the part to be connected therewith and forming the blank and part together whereby to interlock integral portions thereof in the expanded nicks of the formed blank.

ROBERT K. WINNING.